(No Model.) 12 Sheets—Sheet 1.

W. A. GABRIEL.
REPEATING WATCH.

No. 587,574. Patented Aug. 3, 1897.

Witnesses
Chas. J. Williamson.
Henry C. Hazard.

Inventor
Wm. A. Gabriel, by
Crindle and Russell, his Attys.

(No Model.) 12 Sheets—Sheet 2.
W. A. GABRIEL.
REPEATING WATCH.

No. 587,574. Patented Aug. 3, 1897.

(No Model.) 12 Sheets—Sheet 3.
W. A. GABRIEL.
REPEATING WATCH.

No. 587,574. Patented Aug. 3, 1897.

Witnesses
Chas. J. Williamson
Henry C. Hazard

Inventor
Wm. A. Gabriel, by
Prindle and Russell, his Attys (No Model.) 12 Sheets—Sheet 4.
W. A. GABRIEL
REPEATING WATCH.

No. 587,574. Patented Aug. 3, 1897.

Witnesses
Chas. J. Williamson
Henry C. Hazard

Inventor
Wm. A. Gabriel, by
Prindle and Russell, his Attys (No Model.) 12 Sheets—Sheet 5.
W. A. GABRIEL.
REPEATING WATCH.

No. 587,574. Patented Aug. 3, 1897.

Witnesses
Chas. J. Williamson
Henry C. Hazard

Inventor
Wm. A. Gabriel, by
Prindle and Russell, his Attys (No Model.) 12 Sheets—Sheet 6.

W. A. GABRIEL.
REPEATING WATCH.

No. 587,574. Patented Aug. 3, 1897.

Witnesses
Chas. J. Williamson
Henry C. Hazard

Inventor
Wm. A. Gabriel, by
Prindle and Russell his Att'ys (No Model.) 12 Sheets—Sheet 7.

W. A. GABRIEL.
REPEATING WATCH.

No. 587,574. Patented Aug. 3, 1897.

(No Model.) 12 Sheets—Sheet 8.

W. A. GABRIEL.
REPEATING WATCH.

No. 587,574. Patented Aug. 3, 1897.

Witnesses
Chas. J. Williamson
Henry C. Hazard

Inventor
Wm. A. Gabriel by
Prindle and Russell his attys (No Model.) 12 Sheets—Sheet 9.

W. A. GABRIEL.
REPEATING WATCH.

No. 587,574. Patented Aug. 3, 1897.

Witnesses
Chas. J. Williamson.
Henry C. Hazard.

Inventor
Wm. A. Gabriel by
Prindle and Russell his Attys (No Model.) 12 Sheets—Sheet 10.
W. A. GABRIEL.
REPEATING WATCH.

No. 587,574. Patented Aug. 3, 1897.

Witnesses
Chas. J. Williamson
Henry C. Hazard

Inventor
Wm. A. Gabriel, by
Prindle and Russell, his Atty's (No Model.) 12 Sheets—Sheet 11.

W. A. GABRIEL.
REPEATING WATCH.

No. 587,574. Patented Aug. 3, 1897.

Witnesses
Chas. J. Williamson.
Henry C. Hazard.

Inventor
Wm. A. Gabriel, by
Arindle and Russell, his Attys.

(No Model.) 12 Sheets—Sheet 12.

W. A. GABRIEL.
REPEATING WATCH.

No. 587,574. Patented Aug. 3, 1897.

Witnesses
Chas. J. Williamson
Henry C. Hazard

Inventor
Wm. A. Gabriel, by
Prindle and Russell, his Attys

UNITED STATES PATENT OFFICE.

WILLIAM A. GABRIEL, OF ELGIN, ILLINOIS, ASSIGNOR TO THE ELGIN NATIONAL WATCH COMPANY, OF CHICAGO, ILLINOIS.

REPEATING WATCH.

SPECIFICATION forming part of Letters Patent No. 587,574, dated August 3, 1897.

Application filed January 26, 1892. Serial No. 419,262. (No model.)

*To all whom it may concern:*

Be it known that I, WILLIAM A. GABRIEL, a citizen of the United States, residing at Elgin, in the county of Kane and in the State of Illinois, have invented certain new and useful Improvements in Repeating Watches; and I do hereby declare that the following is a full, clear, and exact description thereof, reference being had to the accompanying drawings, in which—

Figure 1:
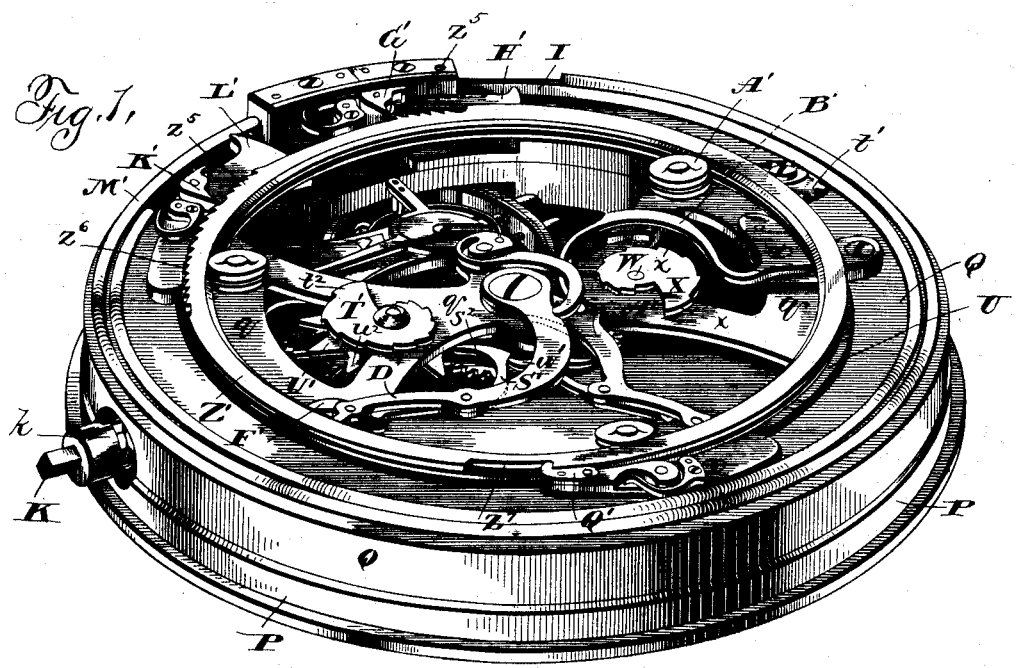
Figure 2:
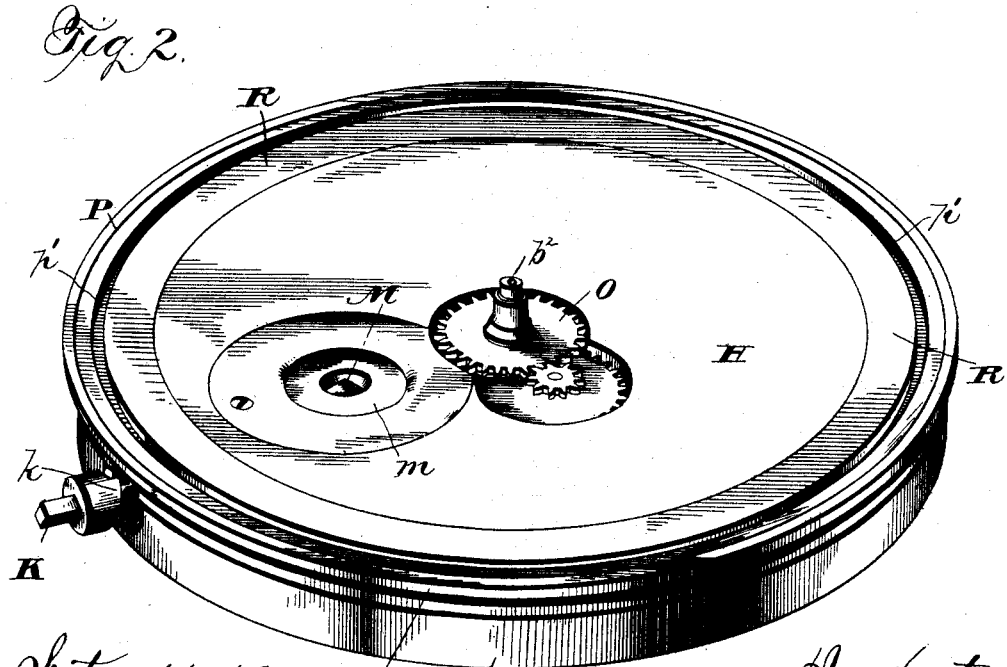
Figure 3:
Figure 4:
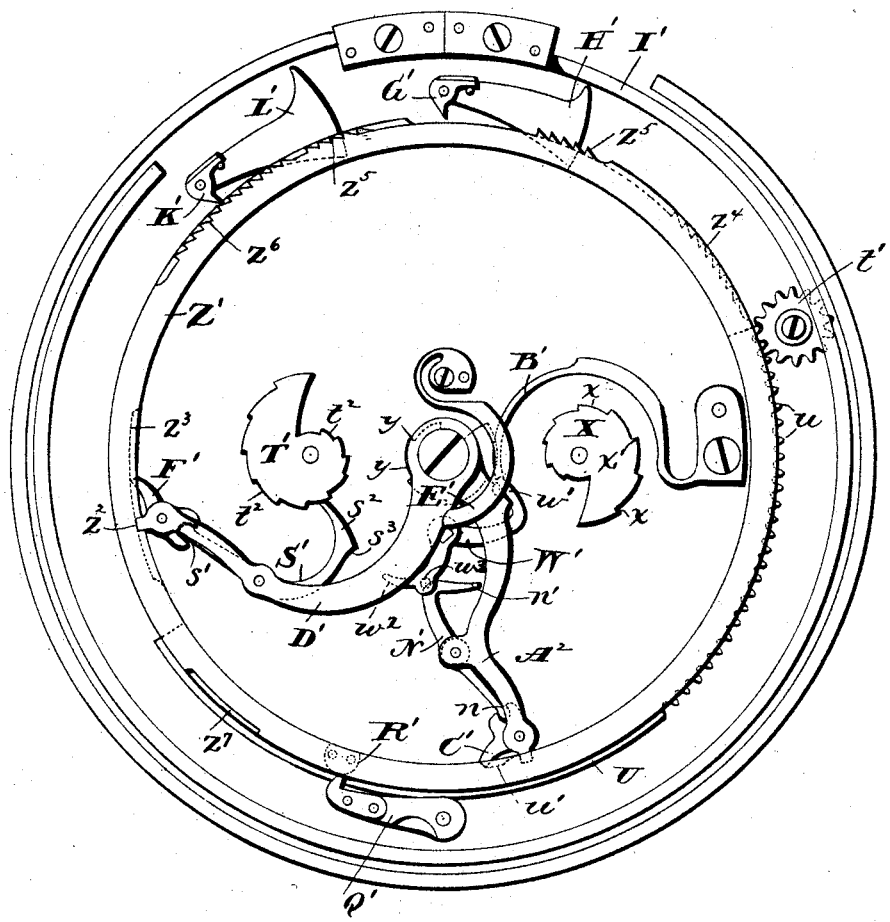
Figure 5:
Figure 6:
Figure 7:
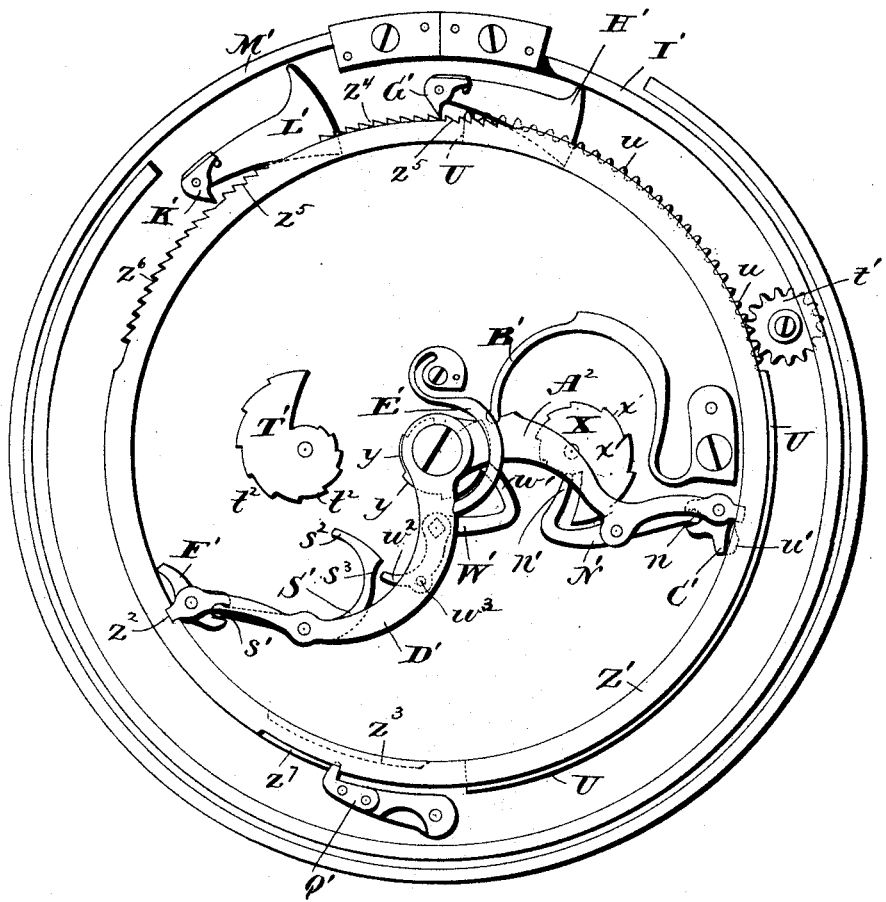
Figure 8:
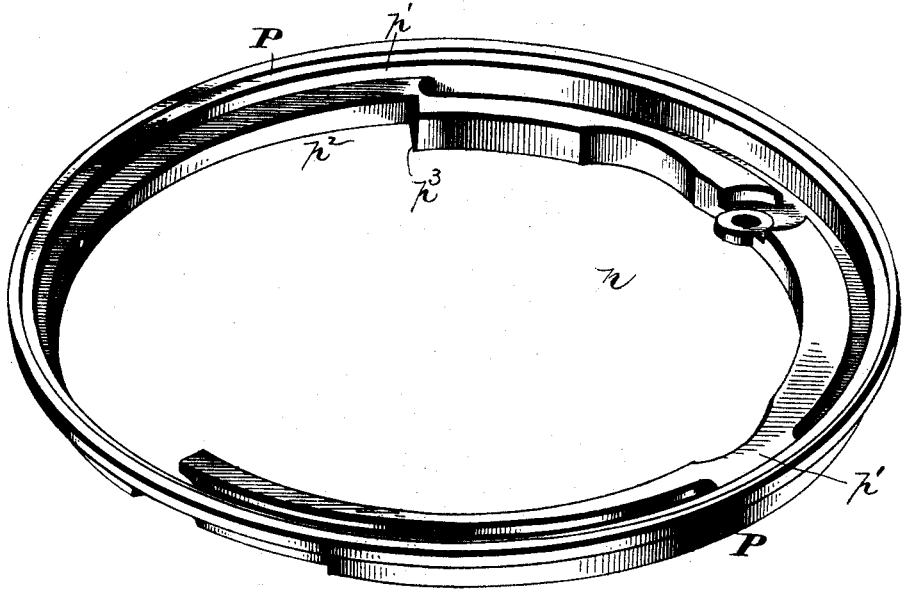
Figure 9:
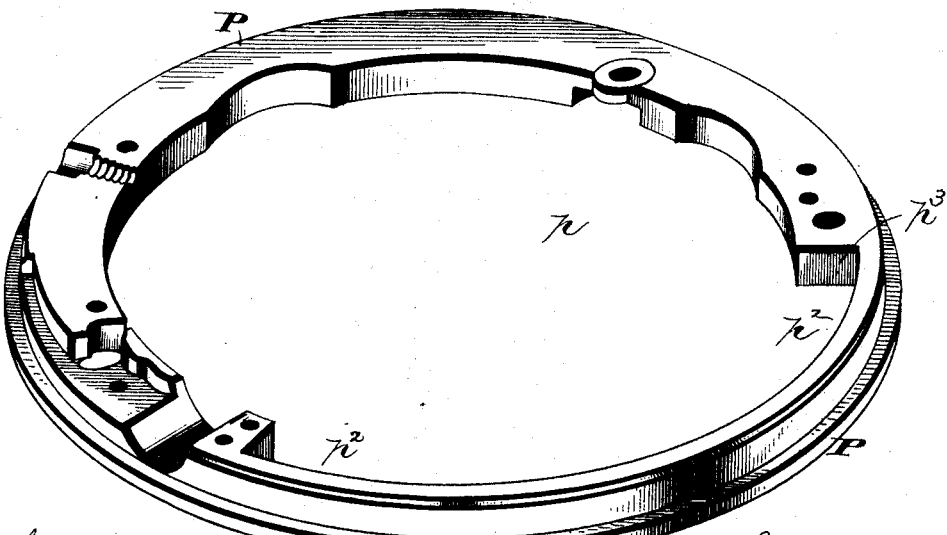
Figure 10:
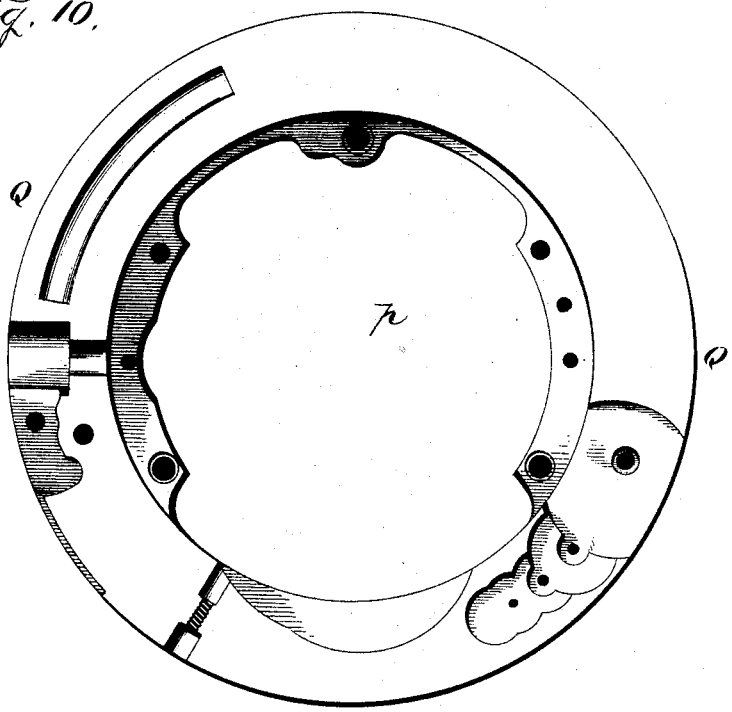
Figure 11:
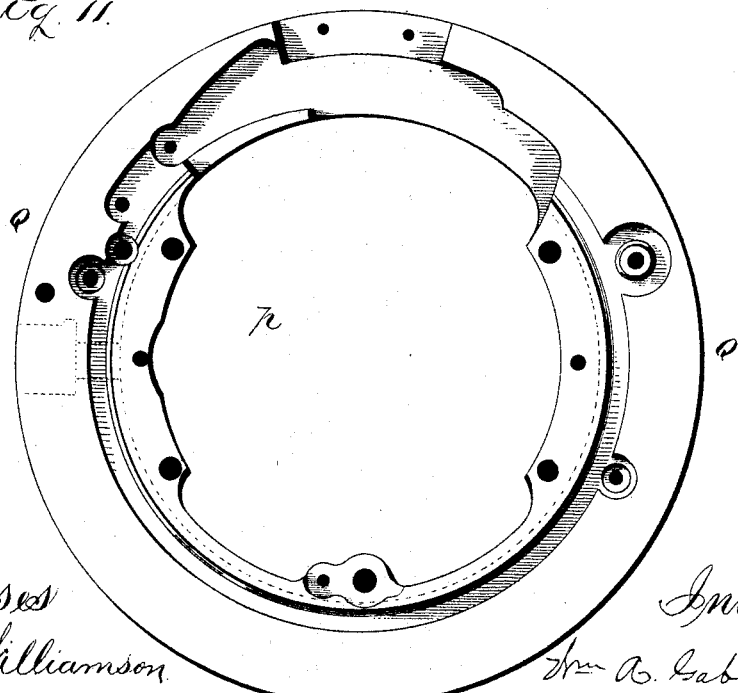
Figure 12:
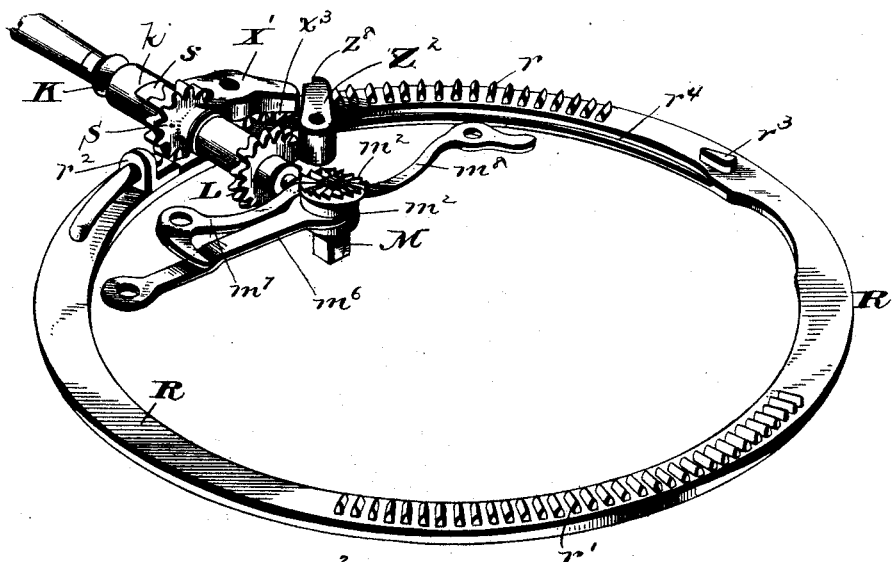
Figure 13:
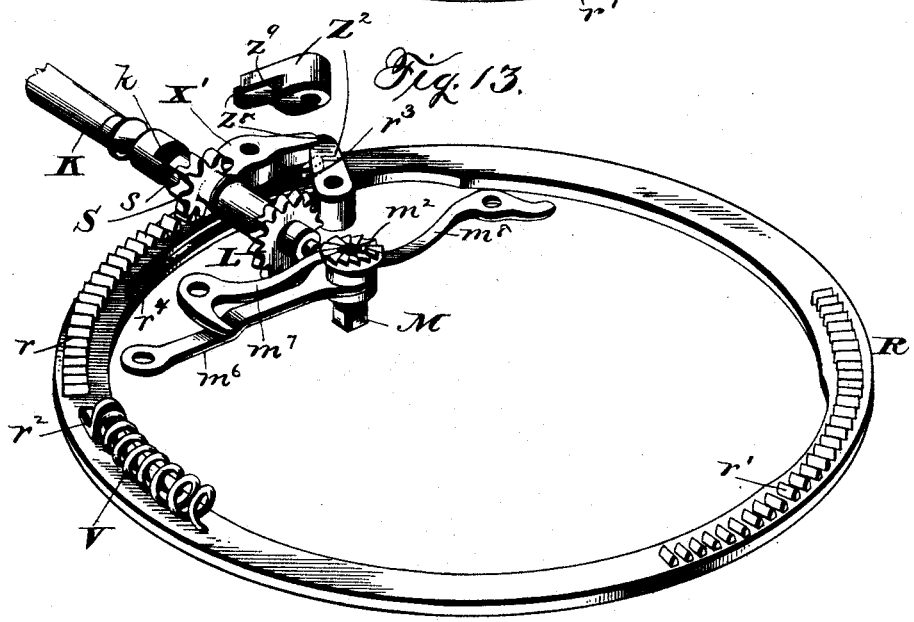
Figure 14:
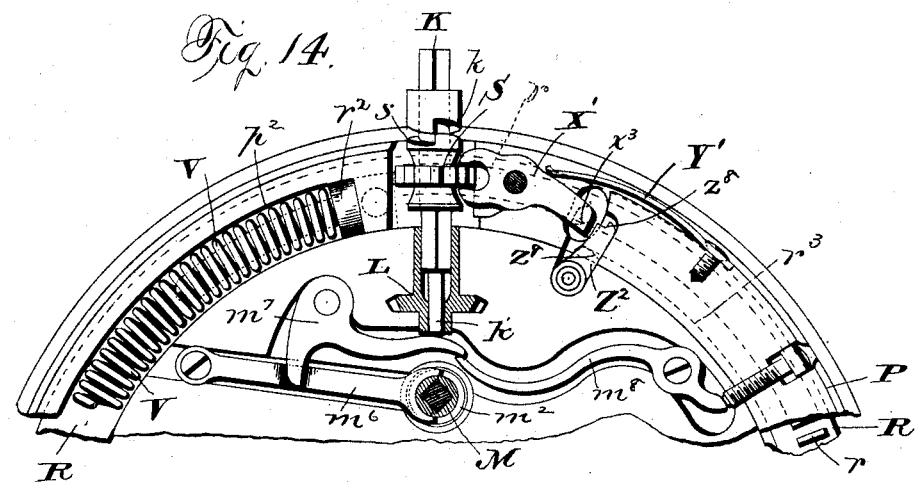
Figure 15:
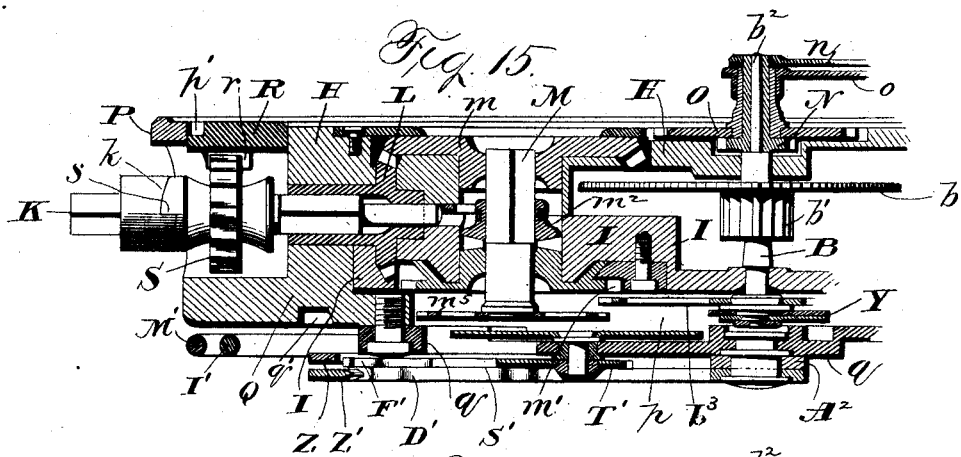
Figure 16:
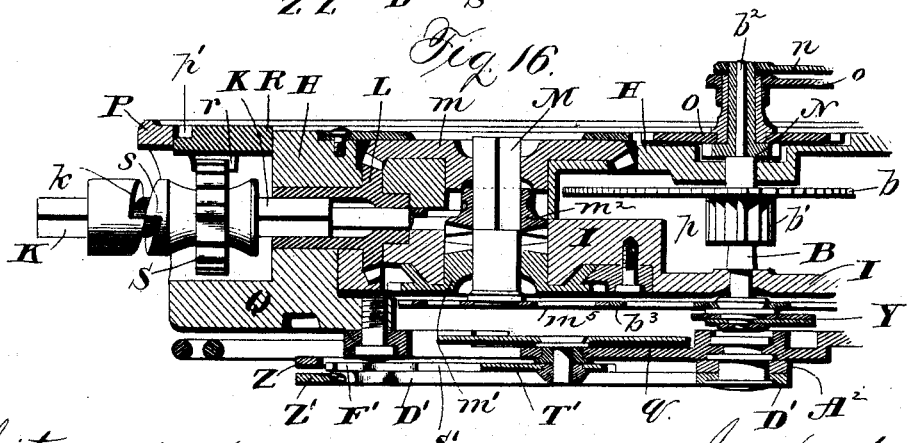
Figure 17:
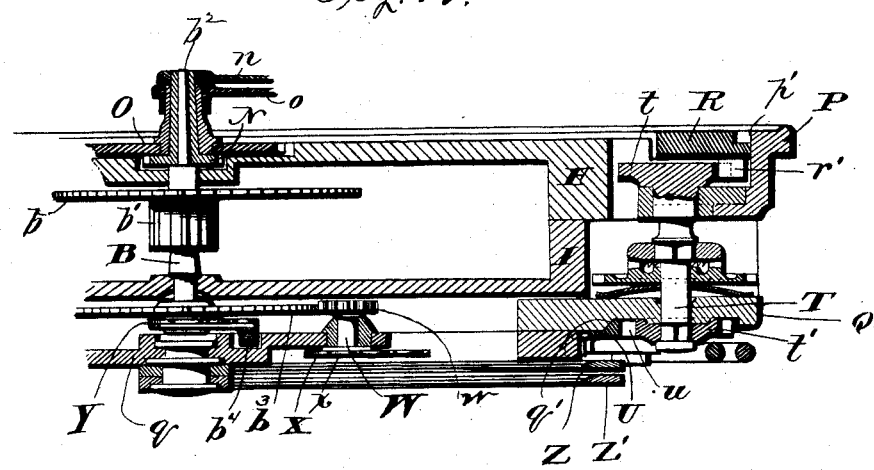
Figure 18:
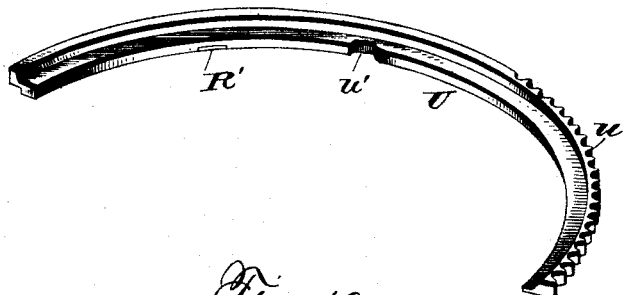
Figure 19:
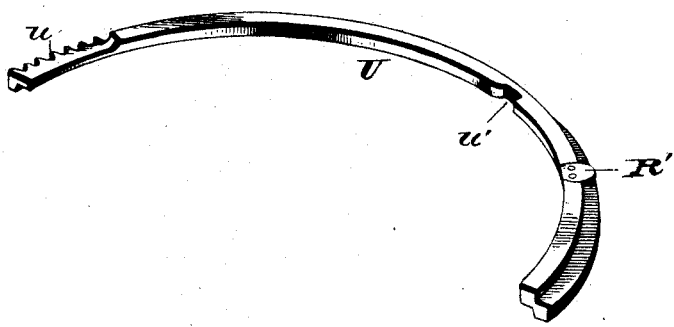
Figure 20:
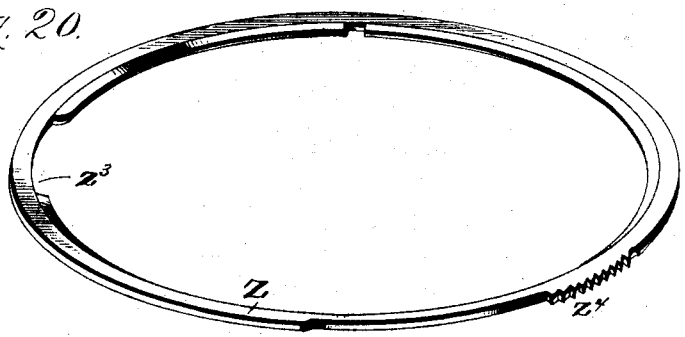
Figure 21:
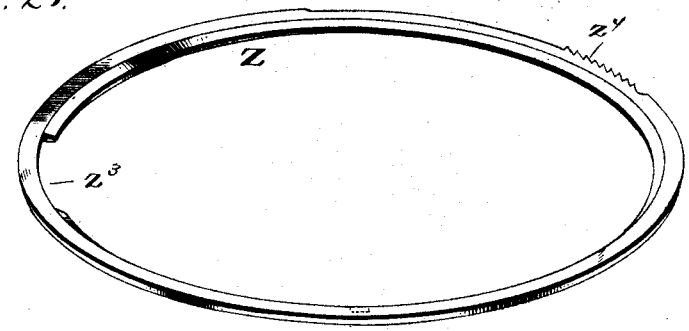
Figure 22:
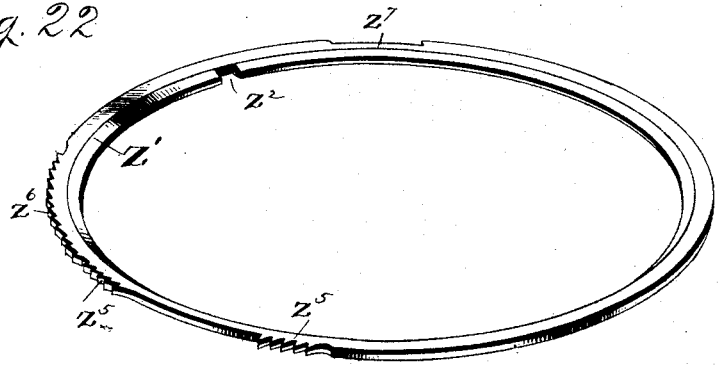
Figure 23:
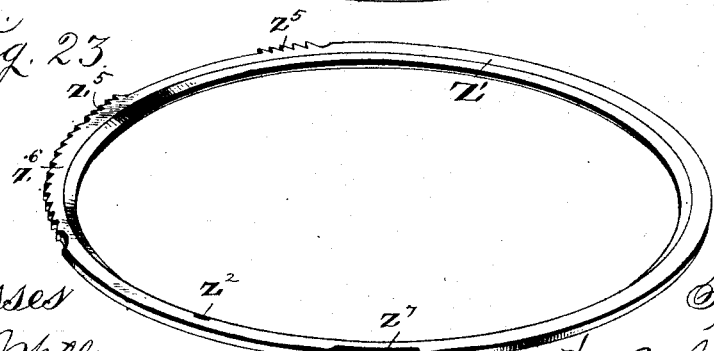

Figure 1 is a perspective view of my watch-movement from the rear side, said movement being separated from its case. Fig. 2 is a like view of the same from the front side, the dial being removed. Fig. 3 is a plan view of said movement from the rear side, the repeating mechanism being shown at rest. Fig. 4 is a like view of the repeating mechanism when placed in position for striking. Fig. 5 is a plan view of said repeating mechanism after having struck the hours. Fig. 6 is a like view of the same after the tens of minutes have been struck. Fig. 7 is a plan view of the same after the minutes have been struck. Figs. 8 and 9 are perspective views of the main or front section of the inclosing frame from the front and rear sides, respectively. Figs. 10 and 11 are plan views of the rear section of said frame from opposite sides. Fig. 12 is a perspective view from the inner side of the operating-ring and its connecting parts when occupying their normal positions. Fig. 13 is a like view of the same when the operating-ring has been moved to position for action upon the repeating mechanism. Fig. 14 is a plan view of said parts when the hands-setting mechanism is in position for operation. Figs. 15 and 16 are partial sections upon the axis of the stem-arbor and show, respectively, the relations of parts when occupying their normal positions and when arranged for setting the hands. Fig. 17 is a like view upon a line passing from the center of the movement through the arbor which connects the operating-ring in the front with the partial ring at the rear. Figs. 18 and 19 are perspective views from the front and rear sides, respectively, of the partial ring. Figs. 20 and 21 are like views of the minute-ring from the front and rear sides, respectively. Figs. 22 and 23 are perspective views from the front and rear sides, respectively, of the hours and tens-of-minutes ring.

Letters of like name and kind refer to like parts throughout the several figures.

My invention has for its object the production of a repeating watch in which the time-train and repeating mechanism are independently constructed and are readily separable when desired; and to such end my said invention consists principally in the method employed for combining the time and repeating mechanisms, the method of operating the repeating mechanism from the face side of the movement, the method of operating the hammer-actuating rings, and the method of determining the number of strokes of the hammers, substantially as and for the purpose hereinafter specified.

It consists, further, in the construction of the frame for carrying the repeating mechanism and its combination with the frame of the movement, in the means employed for actuating the repeating mechanism from the face side of the movement, in the construction of the operating-segment and its combination with the hammer-actuating rings, in the means used for connecting and disconnecting said segment and rings, in the mechanism employed for determining the number of strokes of each hammer, in the means used for putting the repeating mechanism into action, and, finally, in details of construction substantially as and for the purpose hereinafter shown.

In the carrying of my invention into practice I employ an ordinary time-train which preferably consists of an arbor A, that has journaled thereon a barrel and main wheel $a$; a second or center arbor B, which is provided with a toothed wheel $b$ and a pinion $b'$, that meshes with said main wheel $a$; a third arbor C, which carries a wheel $c$ and a pinion $c'$, that meshes with said wheel $b$; a fourth arbor D, which is provided with a toothed wheel $d$ and has a pinion $d'$, that meshes with said wheel $c$; a fifth arbor E, which is provided with an escape-wheel $e$ and a pinion $e'$, that meshes with said wheel $d$; a pallet-arbor F with pallets $f$ and $f$, and a balance-arbor G and balance $g$, which train is arranged, substantially as shown, between two movement-plates H and I, of usual construction. Within one side of the movement thus constructed is journaled radially an arbor K, that when such movement is in a case constitutes or is connected with the stem-arbor and is rotatable within the case-stem in the usual manner and at or near its inner end is adapted to engage with a hollow pinion L, which is suitably journaled within or between the movement-plates H and I and engages with a wheel $m$, that is journaled within or upon said plate II. Said wheel $m$ has a square central opening, into which is loosely fitted the squared portion of an arbor M, that is journaled within a second wheel $m'$, which wheel is journaled within the plate I and is provided with a round axial opening, the arrangement being such as to permit said arbor to rotate freely within said wheel $m'$ and to move longitudinally within the same and said wheel $m$. A clutch-faced collar $m^2$, secured rigidly to said arbor, is adapted to engage with a clutch-face upon the hub of the wheel $m'$ when the former is moved to the limit of its longitudinal motion in one direction and operate to connect the latter through said arbor, the wheel $m$, and the pinion L with the stem-arbor K, so that the rotation of said stem-arbor will cause a corresponding rotation of said wheel $m'$, and through a wheel $m^3$, that is journaled upon the plate I, and a wheel $m^4$, which meshes with the latter and is secured upon the winding-arbor A, enable the mainspring to be wound.

The center arbor B is provided with an axial opening within which is a frictionally-operated arbor $b^2$, that upon its front end carries a minute-pinion N, and upon the latter is journaled an hour-pinion O, which pinions carry, respectively, a minute-hand $n$ and an hour-hand $o$, and are connected so as to have the necessary relative rotations by means of the usual dial-wheels.

Upon the end of the round portion of the arbor M is secured a wheel $m^5$, which, when said arbor is at the limit of its longitudinal motion in one direction, with the clutch-collar $m^2$ out of engagement with the wheel $m'$, as seen in Fig. 16, occupies the same plane as and meshes with a wheel $b^3$, that is secured upon the rear end of the arbor $b^2$ and enables the hands $n$ and $o$ to be set by a rotation of the stem-arbor K, at which time the latter is disconnected from the winding-arbor A, but when said arbor M is moved to the opposite limit of its longitudinal motion, so as to produce winding engagement, said wheel $m^5$ is moved endwise out of engagement with the wheel $b^3$, when the winding of the mainspring in no manner affects the position of the hands.

The arbor M is held normally in position to produce setting engagement by means of a spring $m^6$, which at one end is secured to the plate I and has its opposite forked end in engagement with a peripheral groove in the collar $m^2$. An L-shaped lever $m^7$ is pivoted upon said plate, near said spring, and has its short arm projecting over the same upon an inclined face and its long arm in position to be engaged by the inner end of the stem-arbor K or by a prolongation of the same $k'$, so that when said arbor is moved to the inner limit of its longitudinal motion said lever will be turned until its said short arm rides over the inclined portion of said spring and forces the latter and the arbor M into the position seen in Fig. 15. An adjustable spring $m^8$, secured upon the plate I, bears against the end of the long arm of the lever $m^7$ and operates to move the same outward, so as to relieve said spring $m^6$ whenever said stem-arbor is drawn outward. As thus arranged, when the stem-arbor is moved to the inner limit of its motion setting engagement is automatically broken and winding engagement produced, while by a movement of said stem-arbor to the outer limit of its motion winding engagement is automatically broken and setting engagement effected.

The movement described is contained within a frame that is composed of two annular sections P and Q, that are secured together upon a central plane, as shown. Said sections are considerably larger in diameter than said movement and peripherally are adapted to fit into and fill any ordinary case having suitable interior dimensions. They have a joint thickness equal to about one and one-third times the thickness of said movement and are provided with a central recess $p$, that is adapted to receive the latter and to cause its front plate H to be substantially flush with the outer face of the section P. Said projection Q, which projects rearward beyond the back plate I, is provided with a bridge $q$, that extends centrally across the latter, as shown.

Within the outer face of the section P, outside of the movement receiving recess $p$, is provided an annular recess $p'$, which receives and contains a ring R, that is provided upon its lower face with a series of teeth $r$ and $r$, as shown, which mesh with a pinion S, that is journaled upon the arbor K, and by means of a clutch-face $s$ upon one end and a correspondingly-opposite clutch-face $k$ upon said arbor is adapted to be connected with and rotated by the latter.

Within the side of the frame substantially opposite the arbor K is journaled an arbor T, which is provided upon opposite ends with pinions $t$ and $t'$, respectively, the first-named of which pinions meshes with a second set of teeth $r'$ and $r'$, arranged on the lower side of the ring R, opposite the series $r$ and $r$, and operates to cause an oscillating motion of the ring to be imparted to said arbor, while said second-named pinion $t'$ engages with peripheral teeth $u$ and $u$, that are formed upon a partial ring U, which is contained within a suitable annular recess $q'$, provided within the rear face of the annular frame-section Q, the arrangement being such that by a rotation of the stem-arbor K said partial ring U, through the pinion S, the ring R, the pinions $t$ and $t'$, and said arbor T, may be caused to move in a circle having a center coincident with the center of the circle of which said partial ring is an arc.

Within the inner side of the frame-section P is a recess $p^2$, which follows the curvature of said section and preferably has a length equal to about one-third the circumference of the same. Said recess receives and contains a spiral spring V, that has its ends confined between one end $p^3$ of the same and a shoulder or bearing $r^2$, which is provided upon the ring R, and operates to move said ring in one direction, when permitted, and to be compressed longitudinally by the movement of the latter in an opposite direction.

The wheel $b^3$, secured upon the rear end of the arbor $b^2$, engages with a pinion $w$, that is secured upon and rotates with an arbor W, which arbor is journaled within the bridge $q$, and upon its outer end carries a snail X, that has ten steps $x\ x$. A second snail Y, having six steps $y\ y$, is secured upon said arbor $b^2$ between said wheel $b^3$ and the bridge $q$.

Concentric with and immediately in rear of the partial ring U are two rings Z and Z', which are supported by and adapted to be moved circumferentially upon three grooved rollers A' A' and A', that are journaled at equidistant points upon the bridge $q$ and embrace the inner peripheries of said rings.

The ring Z is for use in operating the minute-striking mechanism and the ring Z' for operating the hour-striking mechanism, and they are each provided with peripheral teeth, as hereinafter described, for engagement with the hammer-pawls, and each have predetermined limits of motion in either direction. The movement in one direction to operate the striking mechanism is caused by the coiled spring V, while movement in the reverse direction is effected through other springs to be presently described.

Pivoted at one end upon the bridge $q$, at the axial center of the frame, is a lever $A^2$, which has the form shown, and at its outer end engages with the minute-ring Z, so as to be adapted to move the latter when turned upon its pivot. A spring B', secured at one end to said bridge and having its opposite free end in engagement with said lever, as shown, operates, when not prevented, to hold the latter and said ring with a yielding pressure at the rear limits of their motion, and is one of the springs referred to in the preceding paragraph.

Near the outer engaging end of the lever $A^2$, upon its inner face, is pivoted a pawl C', which at its outer end is adapted to engage with a notch or recess $u'$, that is formed within the inner edge of the partial ring U, so that a movement of the latter will cause a corresponding movement of the ring Z. A second lever D' is pivoted in like manner at the axial center of the frame and at its outer end enters into a notch $Z^2$, that is formed within the inner edge of the outer ring Z', and is adapted to cause the latter to move whenever turned upon its pivotal bearing. A spring E' is secured at one end upon the bridge $q$ and at its opposite end engages with said lever D' and operates to move the same and said ring rearward, while upon the inner face near the outer end of said lever is pivoted a pawl F', which engages with a groove $z^3$, that is formed in the inner edge of said ring Z, and by means of such engagement causes a movement of the latter to be transmitted to said ring Z'.

The minute-ring Z is provided with nine peripheral teeth $z^4$, which, when said ring is moved forward, are adapted to engage with a hammer-pawl G' and cause a hammer H' to impinge upon a curved wire bell I', of usual form, while the hour and chimes ring Z' is provided with two separate series of five teeth $z^5\ z^5$ and a third series of twelve teeth $z^6$, which latter and one of the series of five teeth are adapted by the forward movements of said ring to engage with the pawl K' of a hammer L' and sound a bell M', while the teeth $z^5$ of the second series of five are adapted to engage the hammer-pawl G', so as to sound the bell I', the relative arrangement of the teeth of said series of five being such as to cause them to engage their hammer-pawls successively, so as to produce a "ding-dong" or chimes effect.

In operation the hour and chimes ring Z' is caused to move forward until there has been sounded upon the bell M' a number of strokes that equal the time in hours, after which there is a short interval and a number of ding-dong chimes are sounded corresponding to the number of ten minutes which have passed since such hour, when, having performed its office, said hour-ring is released and automatically returns to its normal position, and the minute-ring Z, after a brief interval, causes the hammer H' to sound upon the bell I' a number of alarms equal to the minutes in excess of ten, and then is in turn released and automatically returned to its normal position.

As before stated, the minute-ring Z is moved forward against the pressure of the spring B' by the engagement of the pawl C' with a notch $u'$ in the partial ring U. The duration of such engagement, and consequently the distance to which said ring is moved, is determined by the position of the snail X, operating through an L-shaped lever N', which is pivoted upon the lever $A^2$, with the end $n$ of its long arm in pivotal engagement with one end of said pawl and the end $n'$ of its short arm adapted to impinge upon the nearest step $x$ of said snail. When said partial ring has moved said ring Z substantially the necessary distance to cause the hammer H' to sound upon the bell I' the number of minutes less than ten, said lever end $n'$ engages with said snail-face, when by a further movement of said ring Z said lever is turned upon its pivotal bearing and said pawl thrown out of engagement, so as to permit said ring Z to return to its normal position.

The ring $Z'$ when at rest occupies the position shown in Fig. 3, being locked therein against the rearward tendency of its spring $E'$ by a pawl $Q'$, which is pivoted upon the frame-section Q and is adapted to have its free end engaged with an elongated notch or groove $z^7$, that is provided in the periphery of said ring, when the latter is moved forward until the last of its hour-teeth $z^6$ has passed beyond the pawl $K'$ of the hammer $L'$ and is released from engagement therewith by means of a curved block $R'$, secured upon the outer face of the partial ring U, which engages and operates to press said pawl outward from engagement with said notch $z^7$, when said partial ring is moved nearly to the rear limit of its motion by the ring R and the intermediate mechanism, when said ring R is operated to compress the repeater-operating spring V.

The pawl $F'$, which engages the groove $z^3$ of the ring Z, has pivoted to its rear end one end $s'$ of a lever $S'$, that is centrally pivoted upon the lever $D'$ and has its opposite end $s^2$ curved laterally, as shown, and adapted to engage with the adjacent step $t^2$ of a twelve-step or hour snail $T'$. Said snail is pivoted upon the bridge $q$ at a point opposite the snail X and is caused to rotate step by step by means of a star-wheel $U'$, that is secured to and rotates with said snail and has its teeth $u^2$ and $u^2$ successively engaged by a stud or spur $b^4$ upon the central arbor $b^2$, the arrangement being such that at each complete revolution of said arbor said star-wheel is moved forward one tooth and a new step $t^2$ presented for engagement by said lever. When the lowest of said snail-steps is presented for engagement, said ring $Z'$ will be permitted to move rearward under the stress of its spring $E'$ until the last of the hour-teeth $Z^6$ has passed the hammer-pawl, and upon the forward movement of said ring twelve strokes will be sounded upon the bell, while by the presentation of each of the other steps for engagement by said lever said mechanism will be caused to assume the position necessary for striking the number of hours represented by such step.

After the hours have been struck by the movement in a forward direction of the ring $Z'$ there is a brief interval and the tens-of-minutes teeth $z^5$ come into engagement with the hammer-pawls and operate the hammers. The amount of such movement, and consequently the number of tens of minutes struck, is regulated by means of the six-step snail Y, which, as hereinbefore described, is secured upon and rotates with the center arbor $b^2$, and a W-shaped lever $W'$, that is pivoted centrally, so that one of its arms $w'$ is adapted to engage with the adjacent step $y$ of said snail and the opposite arm $w^2$ is adapted to be engaged by a shoulder $s^3$ of the lever $S'$ as the latter moves forward with said ring $Z'$.

The normal position of the lever $W'$ is with its arm $w'$ swung outward sufficiently to permit the snail Y to rotate without contact; but when the shoulder $s^3$ comes into contact with the arm $w^2$ the further movement of the ring $Z'$ will cause said lever to turn until said arm $w'$ impinges upon said snail, when further movement in such direction will cease and the pawl $F'$ will be automatically thrown out of engagement with the groove $z^3$, leaving the minute-ring Z free to continue its motion and cause the minutes to be struck. When said ring Z has completed its travel and been released from engagement with the partial ring U and returns to its normal position, the lever $N'$ engages with a pin $w^3$ upon the lever $W'$ and moves the latter to its normal position out of engagement with the snail Y.

When the ring $Z'$ has moved forward sufficiently to permit the hours to be struck, the front end of the groove $z^7$ is in position to permit the engaging end of the pawl $Q'$ to drop into engagement; but in consequence of the elongation of said groove said ring is enabled to continue such forward motion until the tens of minutes have been struck, after which upon the release of the pawl $F'$ from engagement said ring is moved rearward automatically until said pawl engages with the front end of said groove.

The movement of the operating-ring R to place the spring V under tension is effected by a backward rotation of the stem-arbor K, so as not to interfere with the winding of the mainspring. The clutch-pinion S is held outward with a yielding pressure, so as to have a normal tendency to engage the clutch-face $k$ of said arbor by means of a lever $X'$, that is pivoted centrally upon or between the sections P and Q and has one forked or notched end in engagement with the sides of said pinion, and a spring $Y'$, which bears upon the opposite portion of such lever and operates to press its forked end and said pinion outward. When said stem-arbor is rotated in a forward direction, said clutch-face $k$ presses said pinion inward and trips or ratchets by the latter, while when rotated rearward said faces engage and said pinion is rotated by the movement of said arbor.

When the ring R has reached the limit of its rearward motion, the pinion S is automatically thrown out of engagement with the stem-arbor K by means of a lug $r^3$, which is provided upon said ring and has an inclined outer face adapted to engage with an oppositely-arranged lug $x^3$ upon the side of the lever $X'$ contiguous to said ring, the action of said parts causing the rear end of said lever to be swung outward and said clutch-faces to be disengaged at the instant said ring reaches the limit of its rearward motion. When thus disengaged, said pinion is locked in position by means of a pawl $Z^2$, which is suitably pivoted between the frame-sections and has its end provided with a notch $z^8$, that is adapted to engage with the rear end of said lever when such end is moved to the limit of its outward motion. The side of the pawl $Z^2$ next to the ring R is provided with a lug $z^9$, which projects into a rabbet $r^4$, that is formed within the edge of said ring, as shown, and is adapted to be engaged by the ends of said rabbet when said ring reaches the limits of its motion in opposite directions. Upon the rearward motion of the latter said pawl is moved into locking engagement with the lever X' just as the disengagement of the pinion S from the stem-arbor is effected, while upon the forward motion of said ring said locking-pawl is disengaged from said lever at the instant when said ring reaches the forward limit of its motion and has completed its work.

When the stem-arbor K is drawn outward to produce setting engagement, as seen in Figs. 14 and 16, the clutch-face $k$ is moved away from the clutch-face $s$, so that the rotation of said arbor will not affect the repeating mechanism; but otherwise when not in action said repeating mechanism is always in engagement with the stem-arbor and may be wound by a backward movement of the latter, and when such striking mechanism has been wound it is automatically disconnected from said arbor and remains thus disconnected until the hours and minutes have been struck and is then automatically connected again with said arbor.

Having thus described my invention, what I claim is—

1. A repeating mechanism for watches having an independent frame adapted to support such mechanism and to circumferentially inclose or embrace the time-train, substantially as and for the purpose specified.

2. A repeating mechanism for watches having an independent motor and a frame for its support and attachment to the watch adapted to circumferentially inclose the movement and to support said mechanism in part at and in rear of the latter, substantially as and for the purpose set forth.

3. A repeating mechanism for watches having an independent frame adapted to circumferentially inclose the time-movement and to support said mechanism in part at and in rear of the latter, substantially as and for the purpose set forth.

4. A repeating mechanism for watches having an independent actuating-spring and a frame adapted to circumferentially inclose the movement and to support said mechanism in part at and in rear of the latter, said spring being carried by the movement-inclosing portion of the frame substantially as and for the purpose described.

5. A repeating mechanism for watches having an independent frame composed of two rings which are adapted to inclose the watch-movement and to support said mechanism, substantially as and for the purpose shown.

6. A repeating mechanism for watches having a frame which is composed of two rings that are adapted to inclose the watch-movement, one of which rings has a recess for containing the motor-spring and the other carrying the sounding mechanism, in combination with means for transmitting the power of the motor-spring to the latter, substantially as and for the purpose set forth.

7. In combination with a watch, a sounding mechanism arranged at one side thereof, an operating-ring at the opposite side thereof and a spring to move said ring, substantially as and for the purpose specified.

8. In combination with a watch-movement a sounding mechanism arranged at the back thereof, and a spring-actuated ring encircling the movement at the face side of the same, to operate the sounding mechanism, substantially as and for the purpose shown.

9. In combination with a watch-movement, a sounding mechanism, a spring-actuated ring to operate said mechanism and a frame for such parts that circumferentially incloses or surrounds the movement, substantially as and for the purpose shown and described.

10. In a repeating mechanism for watches in combination with suitable bells and hammers, two hammer-actuating rings, supports or journals for each ring that engage it only at separated points, a spring-actuated ring or part, and means to transmit the power of the latter to the former, substantially as and for the purpose specified.

11. In a repeating mechanism for watches, in combination with suitable bells and hammers, two hammer-actuating rings, a spring-actuated ring or part, a partial ring or segment, and means to transmit the power of the latter to the former, substantially as and for the purpose shown.

12. In a repeating mechanism for watches in combination with suitable bells and hammers, means for engaging and actuating the latter, a spring-actuated ring, a partial ring or segment and connections between the latter and the hammer-actuating means, substantially as and for the purpose set forth.

13. In a repeating mechanism for watches, in combination with suitable bells and hammers, the reciprocating rings for engaging and actuating the latter, supports or journals for the rings, and means for moving said rings, substantially as and for the purpose shown and described.

14. In a repeating mechanism for watches, in combination with suitable bells and hammers, two reciprocating hammer-operating devices, a pawl connected to and moving with one of the latter, means for connecting and disconnecting the pawl and the other one of said devices, whereby one device may move the other, and means for moving the actuating device, substantially as and for the purpose specified.

15. In a repeating mechanism for watches, in combination with suitable sounding devices, two actuating rings or parts therefor, a suitably-mounted pawl connected with one of said rings or parts, and means to operate said pawl to place it in and out of engagement with the other one of said rings or parts, substantially as and for the purpose shown.

16. In a repeating mechanism for watches, in combination with suitable bells and hammers, two hammer-actuating rings arranged in different, but concentric planes and adapted to be connected with and disconnected from each other, a partial ring or segment moving in a path concentric with said hammer-rings and adapted to be connected with and disconnected from one of the same and a spring-actuated concentrically-arranged ring that is adapted to be engaged with, and to move the partial ring, substantially as and for the purpose set forth.

17. In a repeating mechanism for watches, in combination with a suitable bell and hammer, a hammer-actuating ring, a lever connected to the latter and pivoted at its axis and made movable to and from a snail driven by the time-train of a watch, substantially as and for the purpose shown and described.

18. In a repeating mechanism for watches, in combination with a suitable bell and hammer, a hammer-actuating ring, a lever pivoted at the axis of the latter and engaging the same to move and be moved thereby, and spring-actuated means to move said lever to and from a snail driven by the time-train of a watch, substantially as and for the purpose specified.

19. In a repeating mechanism for watches in combination, a hammer-actuating ring or part, a pivoted lever to move and be moved by the same, independent means for moving said ring and lever in opposite directions whereby the lever is moved toward and from a snail, and devices to stop their movements in one direction and to release them from the means for moving them in the other direction, substantially as and for the purpose shown.

20. In a repeating mechanism for watches in combination with a hammer-actuating ring or piece and a device to move the same in one direction to which it is connected, a pivoted lever connected thereto, a releasing-lever carried by the pivoted lever, and a stop to engage the releasing-lever, to separate said ring and its motor, substantially as and for the purpose set forth.

21. In a repeating mechanism for watches, in combination with a hammer-actuating ring or piece, and a ring or piece, adjacent thereto, in a parallel plane, and having a notch in its edge, a pivoted lever engaging the hammer-actuating ring, a dog or pawl carried by said lever to engage said notch and a releasing-lever carried by the other ring engaging said dog or pawl, and adapted when engaged by a stop to release the same from its notch, substantially as and for the purpose shown and described.

22. In a repeating mechanism for watches, in combination with suitable bells and hammers, two concentric hammer-actuating devices having limits of motion fixed by the time to be sounded, a toothed partial ring or part, adapted to actuate said hammer devices, a toothed spring-actuated ring, and gearing between the latter and the partial ring, substantially as and for the purpose specified.

23. In a repeating mechanism for watches in combination with suitable bells, two, pivoted, vibratory hammers, two concentric, hammer-actuating rings having toothed peripheries to engage and actuate the hammers, means for automatically connecting and disconnecting said rings, a partial ring, or part, made movable in a path concentric with the hammer-actuating rings and adapted for connection with and disconnection from one of the latter and a spring for moving said partial ring, substantially as and for the purpose shown.

24. In a repeating watch in combination with a time-train, the three snails driven thereby to mark three divisions of time to be sounded upon the bells, two vibratory, bell-hammers, two concentric hammer-actuating rings provided with toothed peripheries to engage and actuate the hammers, and having movements that are fixed by said snails, a lever pivoted at the axis of said rings and permanently connected with one ring and having means for temporary connection with the other ring, whereby said rings are connected, a second lever having a pivot concentric with the other lever and permanently connected with the other ring, and spring-operated devices adapted for temporary connection with said lever and said ring, substantially as and for the purpose set forth.

25. In a repeating mechanism for watches, in combination with a time-train, three snails driven thereby to mark three divisions of time to be sounded, one of which snails is located at the center arbor of the train, two hammer-actuating devices made movable in paths concentric with said center arbor, and two levers pivoted both at such center of motion and connected permanently, one to one hammer-actuating device and one to the other, said levers being movable to and from an appropriate snail and carrying a part to impinge against the same, and means for automatic connection in the one case with the other hammer-actuating device, and in the other case with a part moved by a motor-spring, substantially as and for the purpose specified.

26. In combination with the three snails adapted to determine, respectively, hours, minutes and fractions of an hour greater than minutes, the two hammer-actuating devices, the two pivoted levers connected one to one of the latter and one to the other thereof, and carrying each a part to impinge, respectively, against the hour and minute snails, a third pivoted lever adapted to impinge against the third snail and to be moved to cause such impingement by a part carried by said hour-snail-engaging lever when moved away from its snail and suitable means to move said third lever from said third snail, substantially as and for the purpose shown.

27. In combination with the three snails adapted to determine, respectively, hours, minutes, and tens of minutes, the two hammer-actuating rings, the two pivoted levers connected one to one ring and the other to the other ring, the spring for moving one lever toward the hour-snail to cause a part carried thereby to impinge against said snail, means for moving said lever away from such snail to cause its ring to strike the hours, a third lever to impinge against the tens-of-minutes snail adapted to be engaged and moved by the hour-snail lever on its retrograde movement to permit the tens of minutes to be sounded, means to move the second ring and its lever toward the minute-snail to sound the minutes, and a spring engaging said lever to move it away from its snail and to carry it or a part carried by it into contact with the tens-of-minutes lever to release it from the tens-of-minutes snail, substantially as and for the purpose set forth.

28. In a repeating mechanism in combination with two hammers, two hammer-actuating rings one of which is provided with a series of twelve teeth, to actuate one hammer, and two series of five teeth each that are adapted to alternately actuate both hammers, and the second ring being provided with a series of nine teeth which are adapted to actuate one of said hammers, substantially as and for the purpose set forth.

29. In a repeating mechanism, in combination with two hammers, two hammer-actuating rings, one of which is provided with a series of twelve teeth that are adapted to actuate one hammer and two series of five teeth each which are adapted to alternately actuate both hammers and the second ring is provided with a series of nine teeth that are adapted to actuate one of said hammers, and three snails having, respectively, twelve, six and ten steps which operate to determine the number of strokes to be given by the hammers, substantially as and for the purpose shown and described.

30. In combination with a watch having a rotatable stem-arbor, a repeating mechanism having a motor-spring independent of that of the watch, a toothed movable part engaging said spring, a pinion on said arbor meshing with the teeth of such part and means whereby the pinion may be connected with and disconnected from the stem-arbor, substantially as and for the purpose specified.

31. In a repeating mechanism, in combination with a rotatable ring, a spring which is adapted to be placed under tension by the movement of such ring in one direction, a rotatable arbor, and the devices to be actuated by the return movement of the ring under stress of said spring, substantially as and for the purpose set forth.

32. In combination with the stem-arbor of a watch, a pinion thereon, a toothed ring in mesh with such pinion, and a repeater-actuating spring which is adapted to be placed under tension by a movement of said ring, substantially as and for the purpose shown and described.

33. In combination with a rotatable ring or part, a spring which is adapted to be placed under tension by a movement of such ring, and a rotatable arbor that is connected to said ring and adapted to move the same and is automatically disconnected when the requisite movement has been given the ring, substantially as and for the purpose specified.

34. In combination with a rotatable ring or piece, a spring which is adapted to be placed under tension by a movement thereof, a rotatable arbor, a pinion thereon and in mesh with teeth that are provided on the ring and suitable means for disconnecting the pinion from the arbor when the requisite movement has been given to said ring, substantially as and for the purpose shown.

35. In combination with a rotatable ring or piece, a spring which is adapted to be placed under tension by the movement of such ring, a rotatable arbor, a pinion movable thereon and adapted for engagement with and disengagement from a clutch on such arbor, and a part carried by said ring and arranged to shift said pinion from engagement with said clutch, substantially as and for the purpose set forth.

36. In combination with a rotatable, toothed ring, or piece, a spring which is adapted to be placed under tension by the movement of such ring, a rotatable arbor, a pinion that is adapted to be clutched thereto, a spring-actuated lever arranged to normally hold said pinion in such engagement, a pinion meshing with the teeth of the ring and the part on the ring to shift said lever and through it the pinion from engagement with said arbor, substantially as and for the purpose shown and described.

37. In combination with a rotatable toothed ring or piece, a spring adapted to be placed under tension by the same when moved in one direction and when allowed to move such spring in a reverse direction, a rotatable arbor, a pinion which is adapted to be clutched thereto, a spring-actuated lever to normally hold said pinion so clutched, a part on the rotatable ring to shift said pinion from engagement with said arbor and a locking device to hold the pinion in this position during a reverse movement of the ring under stress of the spring, substantially as and for the purpose specified.

38. In combination with a toothed ring, a helical spring adapted to be compressed by the same, an arbor for rotating said ring, hammer-actuating devices and a gearing located between the latter and said toothed ring, to transmit the movement of said ring under stress of said spring to the hammer-actuating devices, substantially as and for the purpose shown.

39. In a repeating mechanism for watches, the combination of a rotatable snail, a hammer-actuating rack, a pawl engaging the rack to prevent it moving in one direction, a motor-spring, the ring or rotary part for placing the latter under tension, and a projection on said part adapted to disengage the pawl from the rack, substantially as and for the purpose set forth.

40. In a repeating mechanism for watches, in combination with two snails which are adapted to determine the sounding of two divisions of time, a single reciprocating hammer-actuating ring or rack that is adapted to sound both divisions and is provided with an elongated peripheral notch, and a pawl which is arranged to engage with such notch to hold the ring against movement in one direction, substantially as and for the purpose specified.

41. In a repeating mechanism for watches, the combination of a snail, a hammer-actuating device carrying a part which tends normally toward the snail, a locking device which holds said part away from the snail, a motor-spring and a rotary ring for placing the latter under tension that is adapted to release the locking device, substantially as and for the purpose shown.

42. In a repeating mechanism for watches, in combination with a snail, a hammer-actuating ring connected to a lever that is movable toward and from the snail, a second ring which is adapted to move such lever away from said snail and is adapted to be connected with the other ring through the engagement of said lever with said snail, and a locking device that is arranged to hold said lever against movement toward said snail when the two rings are disconnected, substantially as and for the purpose specified.

In testimony that I claim the foregoing I have hereunto set my hand this 19th day of November, 1891.

WM. A. GABRIEL.

Witnesses:
GEO. S. PRINDLE,
CARLOS H. SMITH.